A. ELLIS.
MACHINE FOR MANUFACTURING HIGH EXPLOSIVES.
APPLICATION FILED SEPT. 17, 1902.

1,003,243.

Patented Sept. 12, 1911.
2 SHEETS—SHEET 1.

A. ELLIS.
MACHINE FOR MANUFACTURING HIGH EXPLOSIVES.
APPLICATION FILED SEPT. 17, 1902.

1,003,243.

Patented Sept. 12, 1911.

2 SHEETS—SHEET 2.

UNITED STATES PATENT OFFICE.

AMOS ELLIS, OF PHILADELPHIA, PENNSYLVANIA, ASSIGNOR, BY MESNE ASSIGNMENTS, OF ELEVEN-TWELFTHS TO KELLY MANUFACTURING COMPANY, A CORPORATION OF DELAWARE.

MACHINE FOR MANUFACTURING HIGH EXPLOSIVES.

1,003,243.  Specification of Letters Patent. Patented Sept. 12, 1911.

Application filed September 17, 1902. Serial No. 123,801.

*To all whom it may concern:*

Be it known that I, AMOS ELLIS, a citizen of the United States, residing in the city and county of Philadelphia, State of Pennsylvania, have invented a new and useful Machine for Manufacturing High Explosives, which improvement is fully set forth in the following specification and accompanying drawings.

My invention relates to the manufacture of nitrated carbohydrates for explosives. While other similar media may be employed I have selected preferably any starch as my base.

Figure 1:
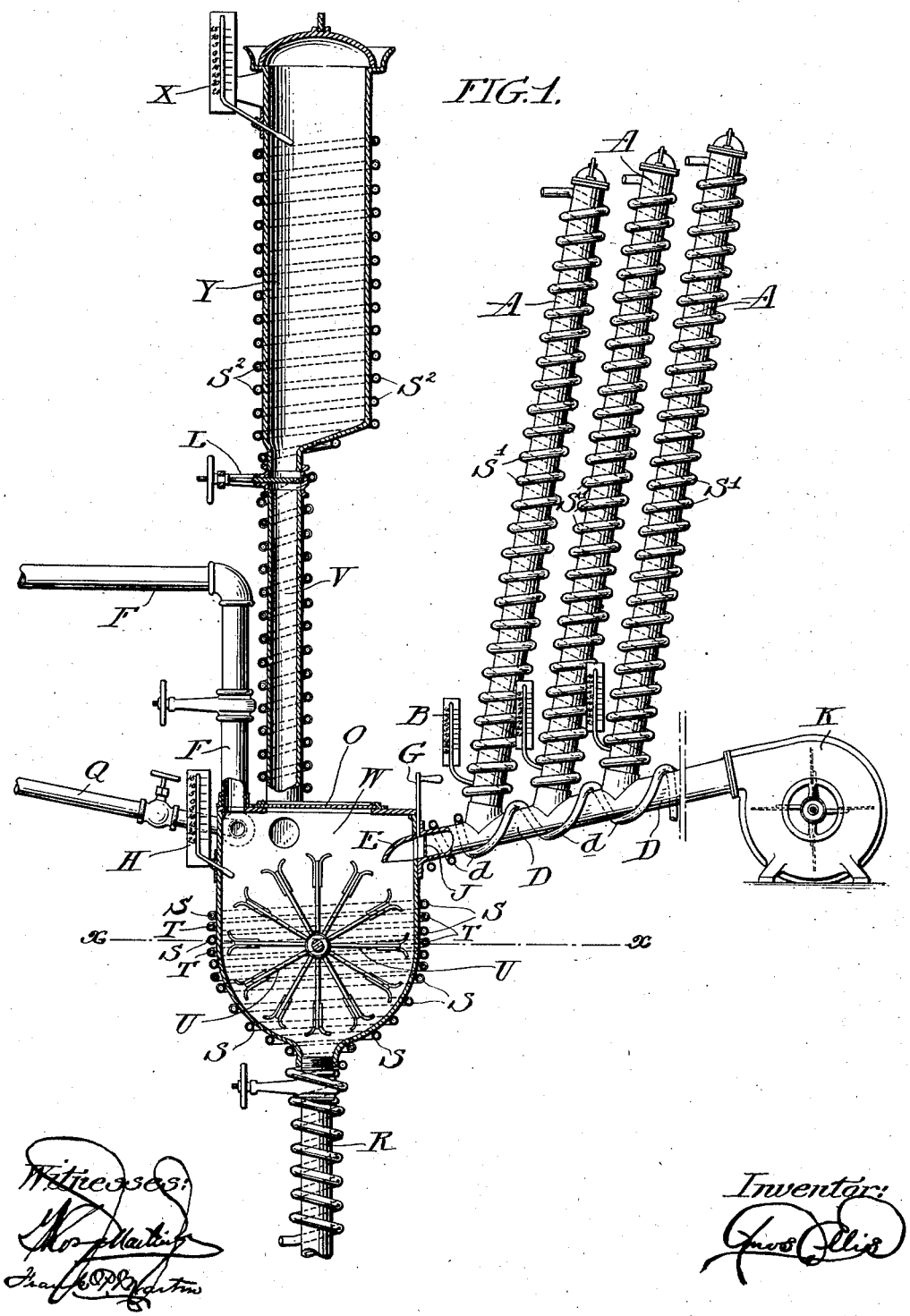
Figure 2:
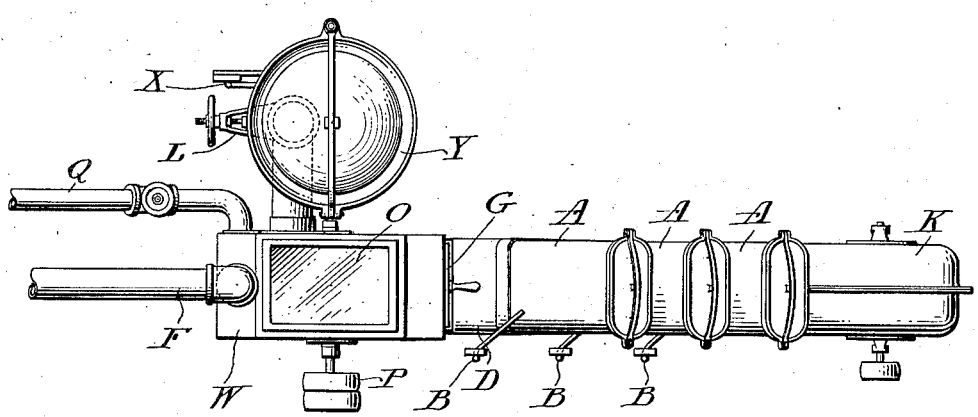
Figure 3:
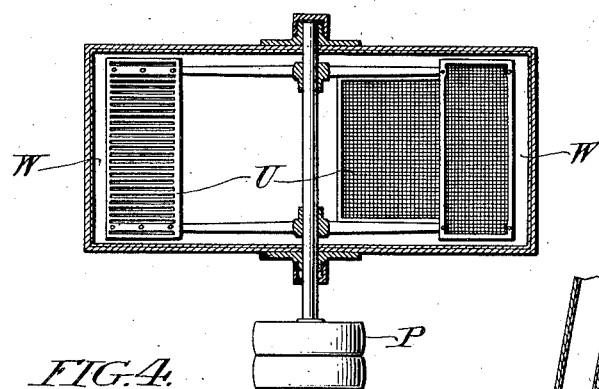
Figure 4:
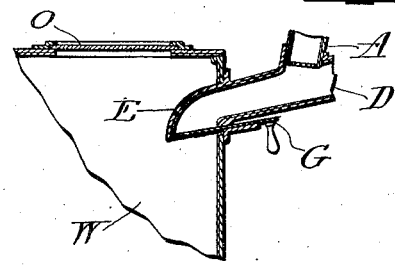
Figure 5:
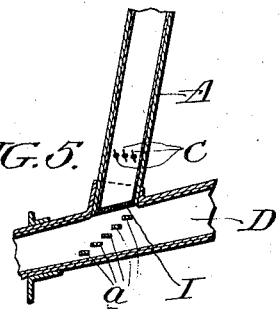

In the drawings, Figure 1 is a view partly in elevation and partly in vertical section of my device. Fig. 2 is a top plan view of the same. Fig. 3 is a horizontal section through the line $x-x$, Fig. 1. Figs. 4 and 5 represent on an enlarged scale portions of the feed passage shown in Fig. 1.

My machine is shown with refrigerating appliances, although if used in a cold climate it may be used without them.

The refrigerating may be accomplished by any of the known methods although for illustration I have selected the compressed ammonia pipe system.

I place the material in one or more metal cylinders (A) having arranged adjacently or in contact with their outer surfaces piping for any of the known methods of refrigeration and provided with externally registering thermometers (B). These cylinders are slanted and connect at their lower end with a feed pipe or channel D through which I pass a current of cold dry air, and which leads into the receptacle or tank (W) which contains the nitrating bath, whereby the material after being properly refrigerated is introduced into said bath in a finely divided or separated state adapted to be thoroughly and highly nitrated. At or near the point of connection between the refrigerating cylinders and the feeding channel are placed valves or gates (C) which can be opened and closed at will to admit of the introduction of the medium into the air draft. Screens $a$ or sieves (I) are so located at or near said gates as to aid in the separation of the material. The feeding pipe (D) is also kept at the required temperature by means of refrigerating pipes (d, d, d,) adjacent to or in contact with its exterior, and is provided with a gate (G) whereby it may be tightly closed when not in use. The blower (K) to supply the cold dry air draft is located so as to force the air through the feed pipe and carry the particles to be nitrated from the receptacles (A) to the tank (W). One or more sieves or screens (J) are placed in said passage or feed channel (D) to further aid the separation of the particles to be nitrated. A hood (E) or other device so arranged as to direct the particles immediately into the bath is placed at the mouth of the feed channel. The excess of air escapes through outlets (F F) located beyond the point of contact between the medium and acid. The nitrating bath is suitably refrigerated in properly lined cylinders (Y) provided with thermometers (X) adjacent to or in contact with any refrigerating device, and is introduced in the nitrating bath by means of the pipe (V) properly refrigerated. The temperature of the contents of the cylinder Y and pipe V is controlled and regulated by the series of pipes $S^2$. The acid supply is regulated and governed by a proper cock or valve (L) located intermediately between the refrigerating cylinder or cylinders and the tank (W). The necessary agitation to accomplish the nitration is obtained by the paddle (U) mounted on an axis or shaft having on its extremity the pulley or wheel (P) whereby the power is applied. This paddle is so adapted as to be rotated in either direction. Suitably attached to the bottom of my bath are one or more vent or discharge pipes R through which the product when nitrated passes for subsequent treatment. This vent can be used to flush out or wash the receptacle (W) for the next operation. For this purpose the tank (W) is provided with connections with cold water pipes (Q) whereby it can be flushed when desired. The temperature of the contents of the tank is controlled and regulated by a series of pipes (S S, T T) suitably arranged in contact with or adjacent to its outer surface, some of said pipes (S S) supplying refrigerating mixtures, and others (T T) supplying heat, all controlled by valves, whereby the supply of heat or cold can be regulated. The tank (W) is further provided with one or more thermometers registering externally the temperature of the contents. The tank is provided with suitable sections of glass (O) or other transparent material, whereby the interior can be under observation at all times.

In operation my device acts as follows:— the material is first introduced into one or more of the cylinders (A) and remains there until it reaches the desired temperature as indicated by the thermometer (B). The acid is likewise placed in the chamber (Y) and remains there until it reaches the proper temperature as indicated by the thermometer (X). Both the material and bath having been sufficiently cooled, the bath is introduced into the tank W by the pipe V and the paddle U set in motion. The gate (G) is then opened and the blower draft turned on. One or more of the valves (C) is then opened allowing the medium to fall into the channel (D) when it is instantly taken up by the draft of air and carried along in a finely divided state, through the screens and then projected into the tank W by means of the hood (E) the excess and spent air escaping the vent (F). The material is immediately taken up by the agitated bath until a correct proportion has been introduced when the valve (C) is closed. The agitation in the tank W is carried on until the proper reaction necessary in nitrating takes place as indicated by the color of the bath (seen through the observation places) and the temperature as registered by the thermometer (H). This reaction is controlled by the heat and cold pipes (S and T). When complete nitration is effected the mixture is run off through the vents (R) for further treatment. The tank W is then flushed with cold water entering through pipes (Q) then going out through the vents R after which gate (G) is opened and the blower turned on, whereby the tank is thoroughly dried, and air passing out either by the escape (F) or the vents (R), leaving the tank in readiness for another operation.

Having thus described my invention, what I claim and desire to secure by Letters Patent, is:—

1. In a machine for making explosives, a nitrating tank, means for positively introducing a liquid into said tank at a desired temperature, means for introducing into said tank finely divided solid particles, means within the tank adjacent the feed opening, to direct the particles immediately into the bath and rotary mechanical means for agitating the liquid in said tank during such introduction.

2. In a machine for making explosives, a nitrating tank, means for positively introducing a liquid into said tank at a desired temperature, means for introducing into said tank finely divided solid particles, means within the tank adjacent the feed opening, to direct the particles immediately into the bath, rotary mechanical means for agitating the liquid in said tank during said introduction and separate means for altering the temperature of said tank.

3. In a machine for making explosives, a nitrating tank, means for positively introducing a liquid into said tank at a desired temperature, a conduit leading to said tank, means for forcing a current of air through said conduit, means for introducing finely divided solid particles into said conduit, a hood within the tank independent of the conduit whereby they are forced by such air current into said tank, a rotary agitator in said tank and means for cooling said solid particles.

4. In a machine for making explosives, a nitrating tank, means for positively introducing a liquid into said tank at a desired temperature, a conduit leading to said tank, means for forcing a current of air through said conduit, means for introducing finely divided solid particles into said conduit, a hood within the tank independent of the conduit whereby they are forced by such air current into said tank, a rotary agitator in said tank and mechanical means for agitating the liquid in said tank during the admission of such solid particles.

5. In a machine for making explosives, a nitrating tank, means for positively introducing a liquid into said tank at a desired temperature, a conduit leading to said tank, means for forcing a current of air through said conduit, means for introducing finely divided solid particles into said conduit, a hood within the tank independent of the conduit whereby they are forced by such air current into said tank, means for altering the temperature of said tank, a rotary agitator in said tank and means for cooling said particles.

6. In a machine for making explosives, a nitrating tank, means for positively introducing a liquid into said tank at a desired temperature, means for cooling the liquid introduced into said tank, a conduit, means for forcing a current of air through said conduit, means for introducing finely divided solid particles into said conduit, a hood within the tank independent of the conduit whereby they are forced by such air current into said tank, a rotary agitator in said tank and means for cooling said particles.

7. In a machine for making explosives, a nitrating tank, means for positively cooling the liquid introduced into said tank, means for cooling a solid, a conduit leading to said tank, means for forcing a current of air through said conduit and means for introducing finely divided particles of said cooled solid into said conduit, a hood within the tank independent of the conduit whereby they are forced by such air current into said tank and a rotary agitator in said tank.

8. In a machine for making explosives, a nitrating tank, means for positively introducing a liquid into said tank at a desired temperature, a conduit leading to said tank, means for forcing a current of air through said conduit, means for introducing finely divided solid particles into said conduit, a hood within the tank independent of the conduit whereby they are forced by such air into said tank, means for directing such particles into the liquid in said tank, a rotary agitator in said tank and means for the escape of air from said tank.

9. In a machine for making explosives, a nitrating tank, means for positively introducing a liquid into said tank at a desired temperature, means for agitating the liquid in said tank, a feed conduit leading into said tank, a blower adapted to force air through said conduit into said tank, a hood in the tank over the discharge of said blower a receptacle for a finely divided solid communicating with said conduit and a valve closing the outlet from said receptacle.

10. In a machine for making explosives, a nitrating tank, means for positively introducing a liquid into said tank at a desired temperature, rotary means for agitating the liquid in said tank, means for cooling a liquid introduced into said tank, a fed conduit leading into said tank, a blower adapted to force air through said conduit into said tank means adjacent the discharge end of said conduit in the tank for directing the said particles downward into the bath and a receptacle for a finely divided solid opening into said conduit.

11. In a machine for making explosives, a nitrating tank, means for positively introducing a liquid into said tank at a desired temperature, rotary means for agitating the liquid in said tank, a feed conduit leading into said tank, a blower adapted to force air through said conduit into said tank, means within the tank adjacent the entrance of the conduit for directing the particles downward into the bath a receptacle for a finely divided solid, opening into said conduit, and means surrounding said receptacle and its outlet pipe for refrigerating such solid in said receptacle and pipe.

12. In a machine for making explosives, a nitrating tank, a liquid receptacle connected with said tank, means for positively refrigerating the liquid in said receptacle, means for indicating the temperature of such liquid, means for agitating the liquid in said tank, a conduit leading to said tank, means for forcing a current of air through said conduit, a hood in the tank over the discharge from said conduit and means for introducing a finely divided solid into said conduit.

13. In a machine for making high explosives, a nitrating tank, means for positively introducing a liquid into said tank at a desired temperature, rotary means for agitating the liquid in said tank, means for altering the temperature of such liquid in said tank, means for indicating the temperature of said tank, a feed conduit, means for forcing a current of air through said conduit, means for introducing a finely divided solid into said conduit and means within the tank adjacent the entrance of the conduit for directing the particles immediately downward into the bath.

14. In a machine for making high explosives, a nitrating tank, means for positively introducing a liquid into said tank at a desired temperature, mechanical rotary means for agitating the liquid in said tank, a feed conduit leading to said tank, means for forcing a current of air through said feed conduit, means for introducing a finely divided solid into said feed conduit means within said tank adjacent the discharge end of the said conduit for immediately directing the particles downward into the bath and a screen in said feed conduit between said introducing means and said tank.

15. In a machine for making high explosives, a nitrating tank, means for positively introducing a liquid into said tank at a desired temperature, rotary mechanical means for agitating the liquid in said tank, a feed conduit leading to said tank, means for forcing a current of air through said feed conduit, means for introducing a finely divided solid into said feed conduit, and means within the tank adjacent the discharge end of the conduit for immediately directing the particles downward and means for closing the end of said conduit adjacent said tank.

16. A nitrating tank, paddles in said tank, means for revolving the same, a feed conduit leading into said tank, a hood at the end of said feed conduit and within said tank, a gate adjacent to said hood, one or more screens within said conduit, a blower adapted to force air through said conduit, chambers opening into said conduit between said blower and said tank, substantially as described.

17. A nitrating tank, paddles in said tank, means for revolving the same a feed conduit leading into said tank, a hood at the end of said feed conduit and within said tank, a gate adjacent to said hood, one or more screens within said conduit, a blower adapted to force air through said conduit, chambers opening into said conduit between said blower and said tank, refrigerating devices adjacent to or in contact with said tank, said conduit and said chambers, thermometers to said tank and said chambers, substantially as described.

18. A nitrating tank, paddles in said tank, means for revolving the same, a feed conduit leading into said tank, a hood at the end of said feed conduit and within said tank, a gate adjacent to said hood, one or more screens within said conduit, a blower adapted to force air through said conduit, chambers opening into said conduit between said blower and said tank, a valve and movable screen at the intersection of each chamber and said conduit, substantially as described.

19. A nitrating tank, paddles in said tank, means for revolving the same, a feed conduit leading into said tank, a hood at the end of said feed conduit and within said tank, a gate adjacent to said hood, one or more screens within said conduit, a blower adapted to force air through said conduit, chambers opening into said conduit between said blower and said tank, a valve and movable screen at the intersection of each chamber and said conduit, refrigerating devices adjacent to said tank, said conduit and said chambers thermometers to said tank and said chambers, substantially as described.

20. A nitrating tank having agitators or paddles therein, one or more flushing pipes, an outlet or drain, ventilating tubes, a bath supply pipe, a vessel connected with said supply pipe, a feed conduit leading into said tank, a hood secured to the inner wall of the tank adjacent of the discharge end of said conduit, refrigerating and heating devices adjacent to said tank and refrigerating devices adjacent to said supply pipe said drain and said vessels, and thermometers connected to said tank and said vessels, substantially as described.

21. A nitrating tank having a transparent observation window, agitators or paddles, one or more flushing pipes, an outlet or drain, ventilating tubes, a bath supply pipe, a vessel connected with said supply pipe, a feed conduit leading into said tank, a hood secured to the inner wall of the tank adjacent the discharge end of said conduit, refrigerating and heating devices adjacent to said tank, refrigerating devices adjacent to said supply pipe and said drain, and said vessel and thermometers connected to said tank and said vessel, substantially as described.

22. A nitrating tank provided with a transparent observation window and having agitator or paddles therein, one or more flushing pipes, an outlet or drain, ventilating tubes, a bath supply pipe, a vessel connected with said supply pipe, a feed conduit leading into said tank, a hood at the end of said feed conduit and within said tank, a gate adjacent to said hood, one or more screens within said conduit, a blower adapted to force air through said conduit, chambers opening into said conduit, between said blower and said tank, a valve and movable screen at the intersection of said chambers and said conduit, all substantially as described.

23. A nitrating tank provided with a transparent observation place and having agitator or paddles therein, one or more flushing pipes, an outlet or drain, ventilating tubes, a bath supply pipe, a vessel connected with said supply pipe, a feed conduit leading into said tank, a hood at the end of said feed conduit and within said tank, a gate adjacent to said hood, one or more screens within said conduit, a blower adapted to force air through said conduit, chambers opening into said conduit between said blower and said tank, a valve and movable screen at the intersection of said chambers and said conduits, refrigerating and heating devices adjacent to said tank, refrigerating devices adjacent to said conduits, said chambers, said supply pipe, said drain, and thermometers to said tank, said chambers and said vessel, all substantially as described.

24. In a nitrating machine a feeding device consisting of a conduit having at one end a blower and at the other end a hood and gate, one or more screens within said conduit, and one or more valves leading thereinto between said blower and said gate.

25. In a nitrating machine a supply chamber adapted to be readily opened at the upper end and provided intermediately with one or more thermometers, and, at the lower end, with a valve and one or more movable screens, and having adjacent thereto a refrigerating device.

In testimony whereof I have signed my name to this specification in the presence of two subscribing witnesses.

AMOS ELLIS.

Witnesses:
KATHRYN A. SUMMERS,
FRANK P. MARTIN.